United States Patent Office 3,316,282
Patented Apr. 25, 1967

3,316,282
ANION EXCHANGE RESIN COMPLEX OF A CYCLOBORATE ESTER OF A STEROID
Eugene Ivashkiv, New York, N.Y., assignor, by mesne assignments, to E. R. Squibb & Sons, Inc., New York, N.Y., a corporation of Delaware
No Drawing. Filed Feb. 8, 1965, Ser. No. 431,161
16 Claims. (Cl. 260—397.45)

This invention relates to a new process for synthesizing and isolating steroids by use of anion exchange resins, and, more particularly, to the synthesis and isolation of steroids containing two cis hydroxyl groups in adjacent positions by forming complexes of the cycloborate esters thereof with anion exchange resins.

Prior to this invention chemical and microbiological conversions of steroids were usually carried out while the steroids were in solution. The products thus formed were then freed of contaminants by use of selective solvent systems or by use of chromatographic columns or paper strips. It has now been found that when such reactions involve a steroid containing two cis hydroxyl groups, the reaction, if the steroid reactant already contains such hydroxyl groups, and/or the recovery can be achieved by forming a complex of the dihydroxy steroid, in the form of its cycloborate ester, and an anion exchange resin. Such complexes are new products that also form an aspect of the present invention.

In essence, the process of this invention entails converting a dihydroxy steroid, wherein the hydroxy groups are in cis relation on adjacent carbons, to its cycloborate ester and forming a complex of such ester with an anion exchange resin. After this has been done, the insoluble complex formed can be separated from soluble impurities by merely removing the liquid portion of the reaction mixture and washing the resin to remove any occluded resin by destroying the complex, thereby regenerating the desired dihydroxy steroid in purified form; or the complex may be used as such for further reaction of the steroid to form new derivatives.

Among the steroids which may be purified or reacted according to the process of this invention or can be used in the preparation of the new complexes of this invention are included any steroid containing two cis hydroxyl groups on adjacent carbon atoms of the steroid nucleus. The preferred steroids, however, are 16α,17α-dihydroxy steroids of the pregnane (including the pregnene, pregnadiene and pregnatriene) series. Such steroids include those of the formula

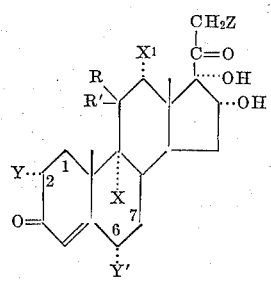

wherein the 1,2- and 6,7-positions are saturated or double-bonded; R is hydrogen, R' is hydrogen or β-hydroxy, or together R and R' is keto; each X is hydrogen, halogen, lower alkyl, hydroxy or lower alkoxy, at least one X being hydrogen or lower alkyl; Y is hydrogen or methyl; Y' is hydrogen, halogen or lower alkyl; and Z is hydrogen, halogen, hydroxy, or the acyloxy radical of an organic or inorganic acid. Among such steroids may be specifically mentioned:

16α-hydroxy-hydrocortisone,
16α-hydroxycortisone,
16α-hydroxyprednisolone,
16α-hydroxy prednisone,
9α-halo-16α-hydroxyhydrocortisone (e.g., 9α-fluoro-16α-hydroxyhydrocortisone),
9α-halo-16α-hydroxycortisone,
9α-halo-16α-hydroxyprednisolone (e.g., 9α-fluoro-16α-hydroxyprednisolone),
9α-halo-16α-hydroxyprednisone,
12α-halo-16α-hydroxyhydrocortisone (e.g., 12α-fluoro-16α-hydroxyhydrocortisone),
12α-halo-16α- hydroxycortisone (e.g., 12α-chloro-16α-hydroxycortisone),
12α-halo-16α-hydroxyprednisolone,
12α-halo-16α-hydroxyprednisone,
6α-methyl-16α-hydroxyhydrocortisone,
6α-methyl-16α-hydroxycortisone,
6α-methyl-16α-hydroxyprednisolone,
6α-methyl-16α-hydroxyprednisone,
2α-methyl-16α-hydroxyhydrocortisone,
2α-methyl-16α-hydroxycortisone,
9α-halo-6α-methyl-16α-hydroxyhydrocortisone (e.g., 9α-fluoro-6α-methyl-16α-hydroxyhydrocortisone),
9α - halo-6α-methyl-16α-hydroxyprednisolone (e.g., 9α-fluoro-6α-methyl-16α-hydroxyprednisolone),
11β,16α,17α-trihydroxyprogesterone,
11-keto-16α,17α-dihydroxyprogesterone,
11β,16α,17α-trihydroxy-1-dehydroprogesterone,
11-keto-16α,17α-dihydroxy-1-dehydroprogesterone,
9α-halo-11β,16α,17α-trihydroxyprogesterone (e.g., 9α-fluoro-11α,16α,17α-trihydroxyprogesterone),
9α - halo - 11β,16α,17α-trihydroxy-1-dehydroprogesterone (e.g., 9α - fluoro-11β,16α,17α-trihydroxy-1-dehydroprogesterone),
12α-halo-11β,16α,17α-trihydroxyprogesterone (e.g., 12α-fluoro-11β,16α,17α-trihydroxyprogesterone),
12α - halo-11β,16α,17α-trihydroxy-1-dehydroprogesterone (e.g., 12α - fluoro - 11β,16α,17α-trihydroxy-1-dehydroprogesterone),
21-halo-11β,16α,17α-trihydroxyprogesterone (e.g., 21-fluoro-11β,16α,17α-trihydroxyprogesterone),
21-halo-11β,16α,17α-trihydroxy-1-dehydroprogesterone,
9α,21 - dihalo-11β,16α,17α-trihydroxyprogesterone (e.g., 9α,21-difluoro-11β,16α,17α-trihydroxyprogesterone),
9α - 21-dihalo-6α-methyl-11β,16α,17α-trihydroxy-1-dehydroprogesterone,
6α-halo-16α-hydroxyhydrocortisones (e.g., 6α-fluoro-16α-hydroxyhydrocortisone),
6α-halo-16α-hydroxycortisones,
6α-halo-16α-hydroxyprednisolones,
6α-halo-16α-hydroxyprednisones,
6α,9α-dihalo-16α-hydroxyhydrocortisones,
6α,9α-dihalo-16α-hydroxyprednisolones (e.g., 6α,9α-difluoro-16α-hydroxyprednisolone),
16α,17α-dihydroxyprogesterone,
16α,17α-dihydroxy-1-dehydroprogesterone,
16α,17α-dihydroxy-6-dehydroprogesterone,
16α,17α-dihydroxy-6α-methylprogesterone,
16α,17α-dihydroxy-6α-haloprogesterones (e.g., 16α,17α-dihydroxy-6α-fluoro-progesterone and 16α,17α-dihydroxy-6α-chloroprogesterone), 16α,17α,21-trihydroxyprogesterone, and 21-esters of those steroids that contain a 21-hydroxy group. The preferred esters are those formed with inorganic acids, such as phosphoric acid and sulfuric acid, and with hydrocarbon mono and dibasic carboxylic acids of less than twelve carbon atoms, such as the lower alkanoic acids (e.g., acetic, propionic and tert-butyric acid), monocyclic aryl carboxylic acids (e.g., benzoic and toluic acid), monocyclic aryl lower alkanoic acids (e.g., phenacetic and β-phenylpropionic acid), lower alkenoic acids, cycloalkanecarboxylic acids, cycloalkenecarboxylic acids, and the lower alkanedioic acids (e.g., succinic acid).

Although any anion exchange resin may be used, the preferred resins are strongly basic anion exchange resins, such as Dowex 1, Dowex 2, Dowex 11 and Dowex 21K (a polymer of polystyrene-divinylbenzene sold by the Dow Chemical Company), Amberlite IRA-400, Amberlite IRA-401 and IRA-410 (a polymer of quaternary strong base (styrene) sold by Rohm & Haas), Lewatit MN, Farbenfabriken, Bayer, Permutit S (quaternary strong base (styrene), sold by Permutit Company), Duolite A-101, A-102 and A-44 (a polymer of quaternary strong base (styrene) sold by Chemical Process Company), Resanex HB (Jos. Crosfield & Sons, Ltd.), IMACA-21, IMAC S-3, IMATAC1 (Holand) Ionac A-550 (Am. Zeolite Corporation), Deocidité ER-63 (Permutit Company, Ltd.).

In the first alternative process of this invention, wherein the steroid, in the form of its cycloborate ester, is interacted with the resin, the resin is in either its hydroxy or, preferably, its salt form. Although salts with any anions may be used, the preferred anions are those of mineral acids, such as sulfuric, nitric and the halohalic acids, and optimally is chloride. In the second alternative process of this invention wherein the free dihydroxy steroid is interacted with the resin, the resin is first converted to its borate form by reacting the resin in its chloride form with a dilute sodium borate solution, such as 3% borax solution.

To form the new complexes of this invention, the dihydroxy steroid is either first converted to a cycloborate ester and then interacted with the anion exchange resin, or the resin is first converted to its borate form and then interacted with the free dihydroxy steroid. In either case, the reaction is conducted at a pH greater than about 5.5 by treating an aqueous solution of the steroid with the resin in fine particulate form.

If a cycloborate ester of the steroid is used, it may be prepared as disclosed in U.S. Patents No. 2,831,003 and 3,119,749 by interacting the dihydroxy steroid with boric acid or a salt of boric acid at a pH greater than about 5.5, and optimally about 7.0 to 9.5. The resulting compound is the cycloborate ester of the steroid reactant in the form of its salt with the base present in the reaction mixture. Although any salt may be used, preferably salts with alkali metals (e.g., sodium) or ammonia are used.

The complexes of this invention may then be used as such as reactants for the preparation of other steroids. Thus, for example, those steroids of the formula given hereinbefore, wherein the 1,2- and 6,7-positions are saturated may be dehydrogenated while in the form of their resin complexes by treatment with the enzymes of a 1-dehydrogenating microorganism by the general methods disclosed in U.S. Patents No. 3,005,839 and 3,119,749, and the resulting 1-dehydro derivatives may then be separated from the resin as more fully described hereinafter.

After removal of all soluble impurities, the steroid present in the form of its resin complex may be regenerated by treating the resin with water, an organic solvent, such as a water miscible organic solvent as exemplified by the lower alkanols (e.g., methanol and isopropanol), lower alkanones (e.g., acetone), dimethylformamide, dimethyl sulfoxide and pyridine, or an aqueous organic solvent, at an acidic pH. Any acid may be used to achieve the acidic pH, but the preferred acids are the mineral acids, such as nitric acid, sulfuric acid and hydrohalic acids, and optimally is hydrochloric acid. Sufficient acid is used to achieve a pH of about 5 or less, and optimally about 3.0 to about 5.0.

This treatment destroys the complex and releases the steroid in its free dihydroxy form. The steroid may then be recovered in purified form from the organic solvent in the usual manner, as by evaporation of solvent or precipitation of the steroid by the addition of water to free solvent.

The following examples illustrate the invention:

EXAMPLE 1

*Preparation of anion exchange resin complexes of 9α-fluoro-16α-hydroxyhydrocortisone*

4 g. of 9α-fluoro-16α-hydroxyhydrocortisone is dissolved in 60 ml. of 3% borax solution and diluted to 400 ml. by addition of distilled water. 2 g. of Dowex 1-X8 or Amberlite IRA-400 anion exchange resin in its chloride form is transferred to a 4 ounce bottle containing 100 ml. of the steroid solution. The bottle is then shaken mechanically for 90 minutes. The ultraviolet spectrophotometric method is used for the determination of the steroid concentration in the solution before and after absorption on the resin. The results obtained are summarized in the following table:

| Resin | Mesh | Steroid Absorbed (Mg./g. resin) | |
|---|---|---|---|
| | | Wet | Dry |
| Dowex 1-X8 | 20-50 | 133 | 222 |
| Do | 50-100 | 202 | 337 |
| Do | 200-400 | 314 | 524 |
| Amberlite IRA-400 | 20-50 | 108 | 180 |

EXAMPLE 2

*Preparation of anion exchange resin complexes of triamcinolone (9α-fluoro-16α-hydroxyprednisolone)*

4 g. of triamcinolone is dissolved in 60 ml. of 3% borax solution and diluted to 400 ml. by addition of distilled water. 2 g. of Dowex 1-X8 or Amberlite IRA-400 anion exchange resin in its chloride form is transferred to a 4 ounce bottle containing 100 ml. of the steroid solution. The bottle is then shaken mechanically for 90 minutes. The ultraviolet spectrophotometric method is used for the determination of the steroid concentration in the solution before and after absorption on the resin. The results obtained are summarized after absorption on the resin. The results obtained are summarized in the following table:

| Resin | Mesh | Steroid Absorbed (Mg./g. resin) | |
|---|---|---|---|
| | | Wet | Dry |
| Dowex 1-X8 | 20-50 | 71 | 118 |
| Do | 50-100 | 101 | 168 |
| Do | 200-400 | 244 | 407 |
| Amberlite IRA-400 | 20-50 | 69 | 115 |

EXAMPLE 3

*Enzymatic conversion of 9α-fluoro-16α-hydroxyhydrocortisone to triamcinolone via the resin complex*

Dowex 1-X8 resin, mesh 50-100, is converted from its chloride form to its borate form with 3% borax solution. A steroid solution of 325 gamma/ml. of 9α-fluoro-16α-hydroxyhydrocortisone is prepared by dissolving 700 mg. of 9α-fluoro-16α-hydroxyhydrocortisone in 10 ml. of dimethylformamide and diluting to 2000 ml. with distilled water. 2000 ml. of this solution is passed through 5 ml. of the resin at the rate of 25 ml. of solution per minute. 216 mg. of 9α-fluoro-16α-hydroxyhydrocortisone per 5 ml. of resin is absorbed. The resin is washed with distilled water and transferred to a 125 ml. Erlenmeyer flask. Steroid dehydrogenase cell powder (prepared as described in Example 3 of U.S. Patent No. 3,119,749) is suspended in water (at 1.25% wt./v.) and added to the resin. Menadione solution and Ucon are added to the reaction mixture. The reaction mixture is shaken at 35° C. Samples are withdrawn periodically into a 7″ test tube and the resin is washed with distilled water. About 15 ml. of ethanol and 15 ml. of 0.5 N hydrochloric acid are added and stirred on a Vortex mixer. The absorbance of the diluted solution is determined at 241.0 mμ and 271 mμ on the Beckman spectrophotometer. After a reaction time of 2 hours, 77.2% of triamcinolone are found, and after 3 hours, 97.5% of triamcinolone are obtained.

EXAMPLE 4

*Absorption of 9α-fluoro-16α-hydroxyhydrocortisone on a resin column*

Dowex 1–X8, mesh 50–100, in its borate from is packed into a column to the height of 40 cm. (volume 31.4 cc.). A steroid solution of about 325 gamma of steroid per ml. is prepared by dissolving 4.55 gm. of 9α-fluoro-16α-hydroxyhydrocortisone in 500 ml. of dimethylformamide, diluting to 14.0 liters with distilled water, and adjusting the pH of the resulting solution to 7 with 2.0 N sodium hydroxide. The steroid solution is passed through the column at the rate of 10 ml./minute. Aliquots (250 ml.) of the eluate are collected and the absorbance measured at 241.5 mµ on the Beckman spectrophotometer. No steroid is found in the eluate up to 3.5 liters. The column is saturated after about 13.5 liters of steroid solution has passed through the resin bed.

EXAMPLE 5

*Purification of triamcinolone via the resin complex*

Triamcinolone is prepared by the method described in Example 1 of U.S. Patent No. 3,119,749. A sample of the fermentation broth is taken after 29 hours and adjusted to pH 7 with sodium hydroxide. The broth is then passed through a column of Dowex 1–X8, mesh 50–100, in its chloride form at the rate of 10 ml./minute. The column is then washed with water and eluted with acetone, acidified by the addition of concentrated hydrochloric acid, to give an eluate containing purified triamcinolone.

EXAMPLE 6

*Batchwise adsorption and desorption of 9α-fluoro-16α-hydroxyhydrocortisone*

A solution of 9α-fluoro-16α-hydroxyhydrocortisone is prepared by dissolving the steroid in dimethylformamide and diluting with water to the concentration of about 300 gamma of steroid per ml. To 1000 ml. of the steroid solution about 2 g. of wet Dowex 1–X8, mesh 50–100, in its borate form is added and the mixture is shaken on a shaker for one hour. The resin absorbs about 54 mg./g. of steroid per wet resin and about 113.5 mg. of steroid per g. of dry resin.

The resin is washed with water to remove impurities and entrapped steroids and eluted with acetone containing 1 ml. of concentrated hydrochloric acid per 10 ml. of acetone. The first eluate contains 45.2 mg. of steroid/ 10 ml. of acetone and the second wash 4.3 mg. of steroid/10 ml. of acetone.

EXAMPLE 7

*Batchwise adsorption and desorption of triamcinolone*

A solution of triamcinolone is prepared by dissolving the steroid in dimethylformamide and diluting with water to the concentration of about 300 gamma of steroid per ml. To 1000 ml. of the steroid solution about 2 g. of wet Dowex 1–X8, mesh 50–100, in its borate form is added and the mixture is shaken on a shaker for one hour. The resin absorbs about 20.8 mg. of steroid per g. of wet resin and about 39.5 mg. of steroid per g. of dry resin.

The resin is washed with water to remove impurities and entrapped steroids and eluted with methanol containing 1 ml. of concentrated hydrochloric acid per 10 ml. of methanol. The first eluate contains about 43.6 mg. of triamcinolone per 10 ml. of methanol and the second wash contains about 23.0 mg. of triamcinolone per 10 ml. of methanol.

Pyridine, acetone, dimethylformamide and dimethylsulfoxide can be substituted for the methanol in the procedure of Example 7.

Any other 16α,17α-dihydroxy steroid of the pregnane series can be substituted for the triamcinolone and 9α-fluoro-16α-hydroxyhydrocortisone in the procedures of the foregoing examples. Moreover, any other strongly basic anion exchange resin can be substituted for the resins specifically used.

This invention may be variously otherwise embodied within the scope of the appended claims.

What is claimed is:

1. The complex of a strongly basic anion exchange resin and the cycloborate ester of a 16α,17α-dihydroxy steroid of the pregnane series.

2. The complex of a strongly basic anion exchange resin and the cycloborate ester of a steroid selected from the group consisting of those of the formula

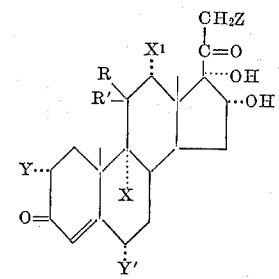

and the 1,2-dehydro and 6,7-dehydro derivatives thereof, wherein R is hydrogen, R' is selected from the group consisting of hydrogen and β-hydroxy, and together R and R' is keto; each X is selected from the group consisting of hydrogen, halogen, lower alkyl, hydroxy and lower alkoxy, at least one X being selected from the group consisting of hydrogen and lower alkyl; Y is selected from the group consisting of hydrogen and methyl; Y' is selected from the group consisting of hydrogen, halogen and lower alkyl; and Z is selected from the group consisting of hydrogen, halogen, hydroxy and acyloxy.

3. The complex of claim 2 wherein the steroid is triamcinolone.

4. The complex of claim 2 wherein the steroid is 9α-fluoro-16α-hydroxyhydrocortisone.

5. A process for preparing a complex of an anion exchange resin and the cycloborate ester of a 16α,17α-dihydroxy steroid of the pregnane series, which comprises interacting an aqueous solution of the cycloborate ester of the steroid with an anion exchange resin.

6. The process of claim 5 wherein the resin is a strongly basic anion exchange resin and the reaction is carried out at a pH above about 5.5.

7. The process of claim 6 wherein the steroid is the cycloborate ester of a steroid of the formula given in claim 2.

8. The process of claim 6 wherein the steroid is the cycloborate ester of triamcinolone.

9. The process of claim 6 wherein the steroid is the cycloborate ester of 9α-fluoro-16α-hydroxyhydrocortisone.

10. A process for preparing a complex of an anion exchange resin and the cycloborate ester of a 16α,17α-dihydroxy steroid of the pregnane series, which comprises interacting an aqueous solution of the free 16α,17α-dihydroxy steroid with an anion exchange resin in its borate form.

11. The process of claim 10 wherein the resin is a strongly basic anion exchange resin and the reaction is carried out at a pH above about 5.5.

12. The process of claim 11 wherein the steroid is of the formula given in claim 2.

13. The process of claim 11 wherein the steroid is triamcinolone.

14. The process of claim 11 wherein the steroid is 9α-fluoro-16α-hydroxyhydrocortisone.

15. A process for purifying a 16α,17α-dihydroxy steroid of the pregnane series, which comprises treating at a pH above about 5.5 an aqueous solution of such steroid and water-soluble impurities with an anion exchange resin in its borate form, separating the resin complex formed, and regenerating the free steroid by treating the complex with an acidified solvent.

16. A process for purifying a 16α,17α-dihydroxy steroid of the pregnane series, which comprises treating at a pH above about 5.5 an aqueous solution of the cycloborate ester of such steroid and water-soluble impurities with an anion exchange resin, separating the resin complex formed, and regenerating the free steroid by treating the complex with an acidified solvent.

References Cited by the Examiner

UNITED STATES PATENTS 3,221,008  11/1965  Wolf et al. _____ 260—210

LEWIS GOTTS, *Primary Examiner.*

ELBERT L. ROBERTS, *Examiner.*

HENRY A. FRENCH, *Assistant Examiner.*